United States Patent
Gaillard et al.

(10) Patent No.: US 6,939,917 B2
(45) Date of Patent: Sep. 6, 2005

(54) IMPACT-RESISTANT COMPOSITION BASED ON THERMOPLASTIC METHACRYLIC (CO) POLYMER

(75) Inventors: Patrice Gaillard, Souchez (FR); Philippe Heim, Pau (FR); Gilles Meunier, Mazerolles (FR); Bruno Vuillemin, Lescar (FR)

(73) Assignee: Arkema, Paris la Defense Cedex (FR)

( * ) Notice: Subject to any disclaimer, the term of this patent is extended or adjusted under 35 U.S.C. 154(b) by 255 days.

(21) Appl. No.: 10/182,671

(22) PCT Filed: Jan. 26, 2001

(86) PCT No.: PCT/FR01/00299

§ 371 (c)(1),
(2), (4) Date: Nov. 12, 2002

(87) PCT Pub. No.: WO01/57133

PCT Pub. Date: Aug. 9, 2001

(65) Prior Publication Data

US 2003/0171491 A1 Sep. 11, 2003

(30) Foreign Application Priority Data

Feb. 1, 2000 (FR) ............................................. 00 01281

(51) Int. Cl.$^7$ .............................. C08F 8/00; C08L 9/00; C08L 25/02; C08L 33/06; C08L 35/02
(52) U.S. Cl. ....................... 525/191; 525/226; 525/227; 525/232; 525/241
(58) Field of Search ................................ 525/191, 226, 525/227, 232, 241

(56) References Cited

U.S. PATENT DOCUMENTS 4,530,973 A * 7/1985 Koster et al. ............... 525/310
4,699,947 A * 10/1987 Kokubo ........................ 525/71
5,777,034 A * 7/1998 Shah et al. .................. 525/228
6,103,830 A * 8/2000 Hirota et al. ................ 525/310

OTHER PUBLICATIONS

XP000390974—Lovell P A et al.: "Studies Of Rubeer–Toughened Poly(Methyl Methacrylate):1. Preparation And Thermal Properties Of Blenda Of Poly(Methyl Methacrylate) With Multiple–Layer Toughening Particles" Polymer, GB, Jordan Hill, Oxford, vol. 34, No. 1, 1993, pp. 61–69.

* cited by examiner

*Primary Examiner*—Nathan M. Nutter
(74) *Attorney, Agent, or Firm*—Millen, White, Zelano, Branigan, P.C.

(57) ABSTRACT

The impact-resistant thermoplastic compositions comprising (A) a rigid thermoplastic methacrylic polymer or copolymer matrix P containing mostly methyl methacrylate units, (B) at least one impact-modifying additive and (C) at least one elastomer copolymer which contains grafting sites, at least on pendant chains, and is obtained from at least one vinylaromatic monomer ($C_1$) and from at one monomer chosen from the monomers ($C_2$): $C_1$–$C_{15}$ linear or branched alkyl acrylates, $C_1$–$C_4$ alkoxyalkyl acrylates and aralkyl acrylates, dienes ($C_3$) and ethylenically unsaturated monomers ($C_4$) having one or more pendant initiating functional groups, the said copolymer (C) being grafted by thermoplastic polymer groups P and being dispersed in the matrix (A) in the form of nodules, which can be called "particles", from 10 nm to 500 nm in size and able to have a droplet, capsule-type monoinclusion and/or salami-type multi-inclusion morphology.

43 Claims, No Drawings

IMPACT-RESISTANT COMPOSITION BASED ON THERMOPLASTIC METHACRYLIC (CO) POLYMER

The invention relates to impact-resistant compositions based on a rigid thermoplastic methacrylic polymer or copolymer containing mostly methyl methacrylate units, to their manufacturing processes and to the articles formed by extrusion moulding, injection moulding and compression moulding obtained from these compositions.

These formed articles exhibit improved impact strength as well as good mechanical properties, especially in tension (elastic modulus) while still retaining a good, or even excellent, level of transparency.

Methacrylic (co)polymers, containing mostly methyl methacrylate units, are thermoplastic polymers used increasingly because of their exceptional optical properties (gloss and very high transparency with at least 90% light transmission in the visible), their hardness, their thermoformability, their resistance to ageing, corrosion and atmospheric agents, and the ease with which they can be converted (cutting, polishing, adhesive bonding, bending).

These thermoplastic (co)polymers, because they are rigid, are liable to fracture during the various phases of their conversion as well as during their transportation and their use.

To improve the impact strength, it is possible to add impact-modifying additives based on elastomer materials.

Impact-resistant methacrylic (co)polymer thermoplastic resins are conventionally obtained by the melt blending of an impact-modifying additive, resulting from the steps of coagulation, dehydration and drying of an elastomer latex, with the particles of the thermoplastic resin or "hard" polymer, which blending results in what is called an alloy.

These impact-modifying additives are generally polymer substances having a multilayer structure, at least one of the layers consisting of an elastomer phase. Their refractive index is adjusted in order to obtain a transparent material. Given that it is the elastomer phase contained in the additive that gives the impact strength, this additive is added to the rigid thermoplastic in order to have a suitable proportion of the elastomer.

In general, it is necessary to add large amounts of impact-modifying additives (about 40% of the weight of the thermoplastic) in order to obtain a suitable impact strength. However, the impact strength is improved at the expense of certain mechanical properties such as the elastic modulus.

Compositions based on rigid methacrylic (co)polymers comprising mostly methyl methacrylate units and having an improved impact strength and good mechanical properties, especially in tension (elastic modulus), while still retaining their transparency, are highly desirable, especially for their use as motor-vehicle glazing.

The subject of the invention is therefore such compositions.

According to the invention, the impact-resistant thermoplastic compositions comprise (A) a rigid thermoplastic methacrylic polymer or copolymer matrix P containing mostly methyl methacrylate units, and (B) at least one impact-modifying additive, and are characterized in that they furthermore comprise (C) at least one elastomer copolymer which contains grafting sites, at least on pendant chains, and is obtained from at least one vinylaromatic monomer ($C_1$) and from at least one monomer chosen from the monomers ($C_2$) $C_1$–$C_{16}$ linear or branched alkyl acrylates, $C_1$–$C_4$ alkoxyalkyl acrylates and aralkyl acrylates, dienes ($C_3$) and ethylenically unsaturated monomers ($C_4$) having one or more pendant initiating functional groups, the said elastomer copolymer (C) being grafted by thermoplastic polymer groups P and being dispersed in the matrix (A) in the form of nodules (which can be called "particles") from 10 nm to 500 nm in size and able to have a droplet, capsule-type monoinclusion and/or salami-type multi-inclusion morphology.

The term "droplet morphology" should be understood to mean elastomer particles with no inclusion of polymer P.

The term "capsule-type monoinclusion morphology" should be understood to mean generally approximately spherical elastomer particles containing a single inclusion of polymer P.

The term "salami-type multi-inclusion morphology" should be understood to mean elastomer particles containing several, generally approximately spherical but non-concentric, inclusions of polymer P.

The rigid thermoplastic polymer P, constituting the matrix A and the groups grafted onto the elastomer copolymer C, comprises, by weight, from 51 to 100% and preferably 80 to 99% of methyl methacrylate units and 0 to 49% and preferably 1 to 20% of ethylenically unsaturated comonomer units copolymerizable with methyl methacrylate.

The droplets serve to absorb the mechanical energy transferred during an impact.

The ethylenically unsaturated monomers copolymerizable with methyl methacrylate are especially chosen from acrylic, methacrylic and vinylaromatic monomers.

As acrylic monomers, mention may be made of acrylic acid, alkyl acrylates in which the alkyl group has from 1 to 8 carbon atoms (such as n-butyl, ethyl, 2-ethylhexyl and isobutyl acrylate), hydroxyalkyl or alkoxyalkyl acrylates, in which the alkyl group has from 1 to 4 carbon atoms, acrylamide and acrylonitrile.

As methacrylic comonomers, mention may be made of methacrylic acid, alkyl methacrylates, in which the alkyl group has from 2 to 8 carbon atoms (such as ethyl, isobutyl, sec-butyl and tert-butyl methacrylate), methacrylonitrile and hydroxyalkyl or alkoxyalkyl methacrylates in which the alkyl group has from 1 to 4 carbon atoms.

As vinylaromatic monomers, mention may be made of styrene and substituted styrenes, (such as α-methylstyrene, monochlorostyrene and tert-butylstyrene).

Component (B) may be a polymer substance having a multilayer structure, at least one of the layers consisting of an elastomer phase. These polymer substances may thus be particles obtained by coagulation or spray drying of an elastomer latex. The manufacture of such latices, used for improving the impact behaviour of thermoplastic matrices, is well known to those skilled in the art. In particular, it is known that by modifying the manufacturing conditions for these latices, it is possible to vary their morphology and, consequently, their ability to improve the impact strength and their ability to retain the optical properties of the matrix to be reinforced.

The various elastomer latex morphologies known at the present time can be used without any problem within the context of the present invention. In particular, it will be possible to use a latex having a "soft-hard" morphology in which the first phase (or core) is an elastomer and the "hard" final phase (or external layer) is a rigid thermoplastic polymer. It is possible to obtain these latices in two steps, for example, in a first step, by the emulsion polymerization in an aqueous medium, in the presence of an initiator generating free radicals and of an emulsifier, of at least one monomer (called "soft" monomer) that has to form the elastomer phase, chosen for example from monomers such as substituted or unsubstituted butadiene and alkyl or aralkyl acrylates, and, in a second step, by the likewise emulsion polymerization, in the presence of the polymer of the first step, of at least one monomer that has to form a "hard" phase compatible with the rigid thermoplastic (matrix) polymer whose impact strength it is desired to improve. This or these monomers (called "hard" monomers) may be chosen for example from alkyl methacrylates, in which the alkyl group comprises from 1 to 4 carbon atoms, vinylaromatic monomers, such as styrene and substituted styrenes, and acrylonitrile and methacrylonitrile monomers. The "hard" phase may also be obtained from a mixture of one or more of the above hard monomers and of one or more ethylenically unsaturated comonomers, such as a lower alkyl (meth) acrylate or acrylic and methacrylic acids.

Optionally, the polymerization of the monomers not forming the "hard" final phase may also be carried out in the presence of ethylenically unsaturated polyfunctional monomers copolymerizable with the latter, particularly crosslinking and/or grafting monomers. The polymer forming the final "hard" phase may possibly be formed in the presence of a crosslinking monomer. As well-known crosslinking monomers which can be used, mention may be made of polyacrylates and polymethacrylates of polyols, such as alkylene glycol diacrylates and dimethacrylates; as grafting monomers that can be used, mention may be made of allyl esters such as allyl acrylate and allyl methacrylate.

Thus, as described in FR-A-2,092,389, the elastomer phase may be produced from a mixture comprising, by weight, at least 50% alkyl or aralkyl acrylate in which the alkyl group has from 1 to 15 carbon atoms and the cyclic (aryl) part contains 5, 6 or 7 carbon atoms, 0.05 to 5.0% of a crosslinking monomer, 0.05 to 5.0% of a grafting monomer, 0 to 10% of a hydrophilic monomer (such as hydroxylated alkyl esters and amides of methacrylic acid, or (meth)acrylic acid), or (meth)acrylonitrile, the remainder optionally consisting of other ethylenically unsaturated copolymerizable monomers (such as styrene); the final rigid thermoplastic phase, polymerized in the presence of the elastomer phase, may be obtained from a monomer mixture comprising at least 50% by weight of alkyl methacrylate, the elastomer phase and the thermoplastic phase having a minimal degree of chemical attachment of approximately 20%.

It is also possible to use a latex having a "hard-soft-hard" morphology, the first, non-elastomer, phase (a core) of which is polymerized from monomers that can form the rigid thermoplastic matrix (A) to be reinforced or the "hard" final phase mentioned above, the intermediate phase of which is an elastomer obtained, for example, from the so-called "soft" monomers mentioned above, and the final phase of which is formed from monomers that can be used for the rigid thermoplastic matrix (A) or the "hard" final phase mentioned above. Particularly suitable is a latex such as described in U.S. Pat. No. 3,793,402 which is formed (1) from a non-elastomer core consisting of a copolymer obtained from 80 to 100% by weight of at least one so-called "hard" monomer, such as an alkyl methacrylate (the alkyl being $C_1$–$C_4$), styrene or (meth)acrylonitrile optionally combined (0–20% by weight) with one or more ethylenically unsaturated comonomers, such as a lower alkyl (meth) acrylate (the alkyl being $C_1$–$C_4$) and acrylic or methacrylic acid, 0 to 10% by weight of a polyfunctional crosslinking monomer and 0 to 10% by weight of a grafting monomer, such as those mentioned above, (2) from an elastomer interlayer, formed in the presence of the polymer (1), from 50 to 99.9% by weight of one or more substituted or unsubstituted butadiene monomers and/or alkyl acrylate monomers, in which the alkyl group has from 1 to 8 carbon atoms, from 0 to 49.9% by weight of one or more ethylenically unsaturated comonomers such as lower alkyl (meth) acrylates (the alkyl being $C_1$–$C_4$), (meth)acrylic acid and styrene, from 0 to 5.0% by weight of a polyfunctional crosslinking monomer and from 0.05 to 5.0% by weight of a grafting monomer, such as those mentioned above, and (3) from a so-called "hard" or compatibilizing external layer formed, in the presence of the polymers (1) and (2), from "hard" monomers ($C_1$–$C_4$ alkyl methacrylate, styrene or (meth)acrylonitrile) optionally combined (0–20% by weight) with ethylenically unsaturated comonomers such as a lower alkyl (meth)acrylate (the alkyl being $C_1$–$C_4$). In particular, the various phases—core (1), interlayer (2) and external layer (3)—represent, respectively, 10 to 40%, 20 to 60% and 10 to 70% by weight of the total mass of the copolymer of the three-layer (three-phase) composite.

Other morphologies that can be used are those, more complex, morphologies described for example in U.S. Pat. No. 4,052,525, EP-B-270,865 and FR-A-2,446,296.

To summarize, it may be stated that component (B) may consist of particles having at least one elastomeric layer obtained from "soft" monomers and a layer for compatibilization with the matrix (A), obtained from "hard" monomers. In general, component (B) is in the form of a multilayer composite copolymer, the particles of which may have a mean diameter of between 40 and 500 nm.

The impact-modifying component (B) (also called impact modifier), useful in the invention, may also consist of a block copolymer comprising at least one elastomer block resulting from the polymerization of monomers such as substituted or unsubstituted butadiene and alkyl or aralkyl (meth)acrylates. In particular, this may thus be a diblock copolymer such as the copolymer butadiene-block-methyl methacrylate, or a triblock copolymer, such as the copolymer styrene-block-butadiene-block-methyl methacrylate), in which copolymers the polybutadiene elastomer phase represents up to approximately 50% by weight of the mass of the block copolymer.

The vinylaromatic monomers ($C_1$) useful for forming the elastomer copolymer (C) may be chosen from those mentioned above as comonomers of methyl methacrylate in order to form the rigid thermoplastic polymer P. The preferred monomer is styrene.

The alkyl or alkoxyalkyl acrylates ($C_2$) that can be used for the elastomer copolymer (C) may be chosen from those indicated above, as monomers for forming the thermoplastic (co)polymer P constituting the matrix (A) and, in particular, $C_4$–$C_{10}$ alkyl acrylates. In the aralkyl acrylates ($C_2$), the alkyl group may have 1 to 15 carbon atoms and the cyclic (aryl) group may contain 5, 6 or 7 carbon atoms. The diene monomers ($C_3$) may be chosen from butadiene and substituted butadienes, such as isoprene, chloroprene and 2,3-dimethylbutadiene. It is the monomers ($C_2$) and ($C_3$) which give the copolymer C the elastomer property.

The monomers ($C_4$) having one or more pendant initiating functional groups entering the composition of the elastomer copolymer (C) may be chosen especially from monomers having peroxide pendant initiating functional groups.

As monomers having one or more peroxide pendant initiating functional groups, mention may be made, for example, of those described in U.S. Pat. No. 5,475,072, particularly those of formula: $R^1$-Q-X—$R^4$ in which Q corresponds to one of the formulae (a), (b) or (c):

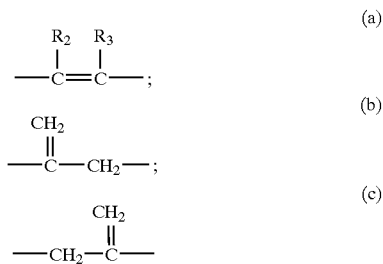

in which:

$R^1$ represents H, carboxyl, $C_2$–$C_{19}$ alkoxycarbonyl, $C_7$–$C_{15}$ aryloxycarbonyl, $C_5$–$C_{11}$ tert-alkylperoxycarbonyl, $C_1$–$C_{18}$ alkyl, $C_2$–$C_{18}$ alkenyl, $C_6$–$C_{20}$ aryl or $R_4$—X;

$R^2$ represents H or $C_1$–$C_4$ alkyl;

$R^3$ represents H, $C_1$–$C_{18}$ alkyl or $C_2$–$C_{18}$ alkenyl, as long as, when $R^3$ represents —$CH_3$, $R^1$ and $R^2$ do not both represent H;

X represents a single bond or a divalent group of formula:

(1)

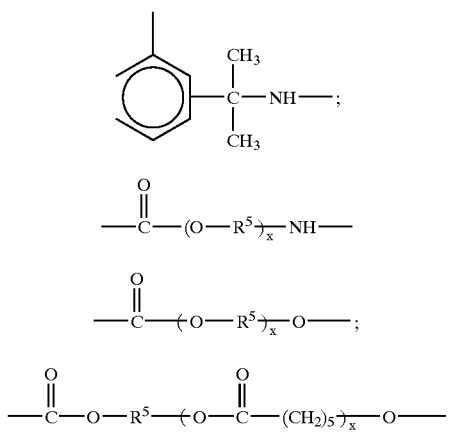

(2)

$$—\overset{O}{\underset{\|}{C}}—(O—R^5)_x—NH—$$

(3)

$$—\overset{O}{\underset{\|}{C}}—(O—R^5)_x—O—;$$

(4)

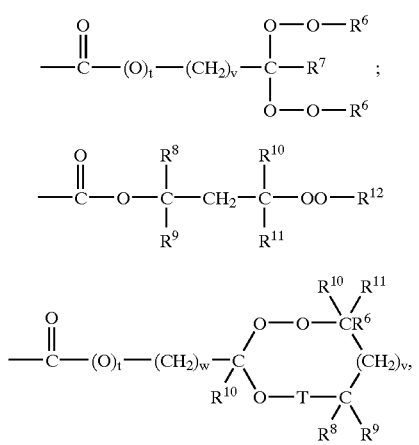

where:
x equals 0 to 10; and
$R^5$ represents a $C_2$–$C_4$ alkylene radical optionally substituted with at least one $C_1$–$C_4$ alkyl radical;

$R^4$ represents a radical of formula:

(5)

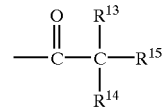

(6)

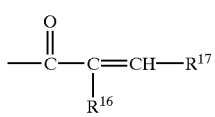

(7)

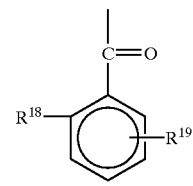

or, when X has the formula (4), (8)

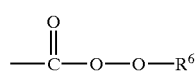

with
t=0 or 1; v=0 or 2; w=1 or 2;
T is a single or oxy bond;
$R^6$ represents a $C_4$–$C_{12}$ tert-alkyl, $C_9$–$C_{13}$ tert-aralkyl or $C_5$–$C_9$ tert-alkynyl radical;
$R^7$, $R^{10}$ and $R^{11}$, which are identical or different, each represent a $C_1$–$C_4$ alkyl;
$R^8$ and $R^9$, which are identical or different, each represent a $C_1$–$C_4$ alkyl or, also in formula (6) and when T represents a single bond in formula (7), a hydrogen atom; and $R^{12}$ represents a $C_4$–$C_{12}$ tert-alkyl, $C_9$–$C_{13}$ tert-aralkyl or $C_5$–$C_9$ tert-alkynyl group, or the structures (9), (10), (11), (12), (13) and (14):

(9)

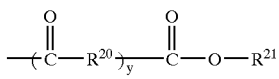

where $R^{13}$ and $R^{14}$, which are identical or different, each represent H or a $C_1$–$C_8$ alkyl; $R^{15}$ represents H, $C_1$–$C_8$ alkyl, $C_2$–$C_8$ alkenyl, $C_6$–$C_{10}$ aryl, $C_1$–$C_6$ alkoxy or $C_6$–$C_{10}$ aryloxy; $R^{14}$ and $R^{15}$ possibly together forming a $C_4$–$C_5$ alkylene radical;

(10)

$$—\overset{O}{\underset{\|}{C}}—\underset{R^{16}}{C}=CH—R^{17}$$

where $R^{16}$ and $R^{17}$ each represent a $C_1$–$C_4$ alkyl;

(11)

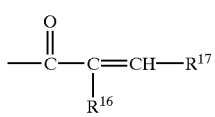

where $R^{18}$ and $R^{19}$ each represent H, OH, F, Cl, Br, $C_1$–$C_4$ alkyl, $C_1$–$C_4$ alkoxy, phenyl, $C_2$–$C_8$ acyloxy or $C_5$–$C_9$ tert-alkylperoxycarbonyl;

(12)

$$—(C—R^{20})_y—\overset{O}{\underset{\|}{C}}—O—R^{21}$$

where $R^{20}$ represents $C_2$–$C_3$ alkylene, optionally substituted with at least one $C_1$–$C_4$ alkyl; 1,2-phenylene optionally substituted with at least one $C_1$–$C_4$ alkyl; carboxyl, Cl, Br or nitro; y=0 or 1; and $R^{21}$ represents $C_1$–$C_8$ alkyl optionally substituted with at least one $C_1$–$C_6$ alkyl; $C_4$–$C_8$ tert-alkylperoxy, $C_1$–$C_6$ alkoxy, $C_6$–$C_{10}$ aryloxy, OH, Cl, Br, —CN; substituted or unsubstituted $C_5$–$C_{12}$ cycloalkyl; $C_5$–$C_{12}$ saturated heterocycle, the heteroatom being O or N, substituted or unsubstituted, the substituents on the rings being at least one $C_1$–$C_4$ alkyl radical; or

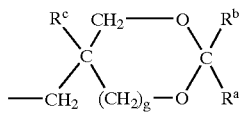

with g 0 or 1 and $R^a$, $R^b$, $R^c$, which are identical or different, each representing H, or a $C_1$–$C_8$ alkyl radical, $R^a$ and $R^b$ possibly together forming a $C_4$–$C_{11}$ alkylene chain optionally substituted with at least one $C_1$–$C_5$ alkyl radical or phenyl;

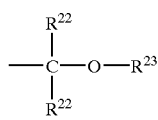

(13)

where $R^{22}$ represents $C_1$–$C_4$ alkyl, or the two $R^{22}$ together form a $C_4$–$C_5$ alkylene radical, and $R^{23}$ represents the groups defined in the case of $R^{10}$; or

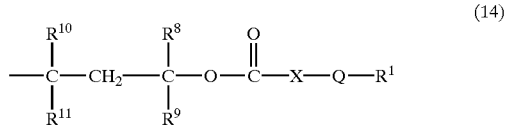

(14)

in which Q, $R^1$, $R^8$, $R^9$, $R^{10}$ and $R^{11}$ are as defined above.

By way of particular examples of monomers having pendant peroxide initiating functional groups, mention may be made of 1,3-dimethyl-3-(tert-butylperoxy)butyl acrylate sold by Elf Atochem North America under the name "R-240":

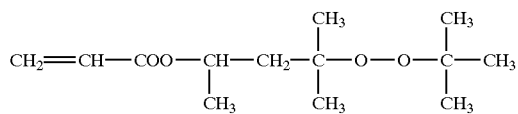

as well as the monomer 1,3-dimethyl-3-(isobutyrylperoxy)butyl N-[1-{3-(1-methylethenyl)phenyl}-1-methylethyl] carbamate of formula:

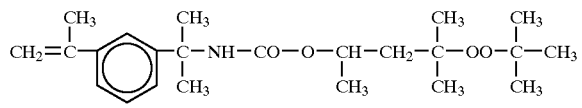

called "R-240 TMI".

The elastomer copolymer (C) must be endowed with functional groups allowing the thermoplastic polymer groups P to be grafted and allowing compatibilization between the elastomer and the polymer P forming the matrix A. The functionalization of the elastomer (C) may take place along the polymer chain or else at pendant positions. The butadiene and substituted butadiene monomers, because of the presence of the two double bonds, allow functionalization both along the polymer chain and in pendant positions; the alkyl acrylates allow grafting within the polymer chain because of the presence of a labile hydrogen in the a position; the monomers having pendant initiating functional groups, like the monomers having peroxide pendant functional groups, allow grafting in pendant positions.

In order to obtain transparent thermoplastic compositions, it is necessary for the refractive indices of the thermoplastic matrix A and of the elastomer C to be equal or to differ by $\Delta n \leq 0.02$.

The compositions according to the invention comprise, by weight, from 50 to 85% and preferably 70 to 80% of component A, from 6 to 40%, preferably 10 to 40% and most particularly from 10 to 20% of component B and from 2 to 15% and preferably 4 to 10% of component C.

The composition, in terms of monomers, from which the elastomer copolymer (C) is obtained is, especially, per 100 parts by weight of all of these monomers, as follows:

15 to 40 and preferably 16 to 20 parts by weight of one or more vinylaromatic monomers ($C_1$);

0 to 85 and preferably 40 to 82 parts by weight of one or more alkyl, alkoxyalkyl or aralkyl acrylates ($C_2$);

0 to 60 and preferably 0 to 5 parts by weight of diene monomers ($C_3$); and from 0 to 5 and preferably 0 to 4.5 parts by weight of ethylenically unsaturated monomers ($C_4$) having one or more pendant initiating functional groups.

The elastomer (C) may also include at least one transfer agent or chain stopper, which is introduced in an amount ranging up to 5% by weight, especially up to 1% by weight, with respect to all of the monomers ($C_1$), $C_2$), ($C_3$) and ($C_4$) used for the polymerization of the said elastomer (C).

This or these transfer agents, allowing the molecular mass of the elastomer (C) which is preferably from 50,000 to 200,000 to be controlled, are chosen especially from known compounds like mercaptans and like dodecanethiol, polymercaptans, polyhalogenated compounds, monoterpenes, monounsaturated diterpenes and thioglycolic acid.

The subject of the present invention is also a first process for manufacturing the thermoplastic composition as defined above, characterized in that:

I. in a first step, a solution copolymerization of the monomers chosen from the monomers $C_1$, $C_2$, $C_3$ and $C_4$ is carried out at a temperature $T_1$ in the presence of at least one free-radical initiator, which is soluble in the solvent and capable of initiating the polymerization at the temperature $T_1$, in order to obtain the elastomer copolymer (C), the sites for grafting the $C_2$, $C_3$ and $C_4$ monomers being inert at the said temperature $T_1$;

II. in a second step, a polymerization is carried out, in the presence of the elastomer (C) of the first step, of the monomer or monomers intended to enter the composition of the thermoplastic polymer P of the matrix (A) and of the thermoplastic polymer groups grafted onto the elastomer (C), optionally in the presence of at least one free-radical initiator, the said monomer or monomers being introduced in the pure state or dissolved in a solvent and the said second step being carried out at a temperature $T_2$, which is greater than $T_1$ and at which the sites for grafting the elastomer (C) are capable of initiating the polymerization or of initiating the grafting of the polymer groups P, the solvents for the first and second steps possibly being identical and being chosen so that the elastomer (C) which is formed in the first step and the thermoplastic polymer P which is formed in the second step are soluble in the said solvent;

III. in a third step, granules formed from components A and C are recovered; and IV. in a fourth step, the granules obtained from step III are blended with component (B) at a temperature of between 200 and 250° C. in order to obtain granules formed from components A, B and C.

The solvent or solvents are chosen especially from those having a boiling point of 100 to 150° C., for example toluene or ethylbenzene.

The polymerization of the first step of this first process according to the invention may be furthermore characterized in that it is carried out:

until a solids content of 10 to 80% by weight is obtained;

optionally in the presence of at least one chain stopper or transfer agent;

at a temperature $T_1$ of 80–110° C.

With regard to the second step, this may furthermore be characterized in that it is carried out at a temperature $T_2$ of 120–200° C. and by using the following ingredients:

1 to 40% by weight of the elastomer (C) obtained in the first step, which is dissolved in the methyl methacrylate which is to form the polymer P; and 60 to 99% by weight of the monomer or monomers intended to enter the composition of the polymer P, if necessary in the presence of an amount of solvent ranging up to 60%, if necessary in the presence of a chain stopper or transfer agent.

The amount of free-radical initiator(s) varies depending on the monomers, on the temperature and on the mode of addition but, as a general rule, the amount of initiator(s) varies, in each polymerization step, from approximately 0.01 to 5% by weight on the basis of the weight of the loading of the monomers.

In the first step, and optionally in the second step, the polymerization mixture contains an effective amount of at least one suitable known polymerization initiator generating free radicals. The preferred initiators are those which are thermally activated, for example peroxides such as tert-butylperoxy-2-ethylhexanoate, dibenzoyl peroxide, tert-butylperoxide, tert-butyl peroxydiethylacetate, or azo compounds such as azobis (isobutyronitrile).

In the third step, it is possible to recover the granules formed from components A and C, after the polymerized mass has passed to the second step, in an extruder or in a devolatilizer.

In the fourth step, the particles formed from components A and C obtained in the third step are blended with component B (the impact modifier), by any suitable means, for example in a Brabender-type mixer, a single-screw or twin-screw extruder, etc., at temperatures of between 200° C. and 250° C.

At the end of the first step, it is also possible to recover the particles of elastomer copolymer (C) by steam flocculation or precipitation. These particles are then introduced into the reaction mixture of the second step.

Various standard additives may be added in this fourth step, such as stabilizers preventing oxidative, thermal or ultraviolet degradation, lubricants, dyes, pigments, fillers and plasticizers.

The subject of the present invention is also a second process for manufacturing the thermoplastic composition as defined above, characterized in that:

I'. in a first step, an emulsion copolymerization of monomers chosen from the monomers $C_1$, $C_2$, $C_3$ and $C_4$ is carried out in an aqueous medium, in the presence of at least one initiator generating free radicals and of at least one emulsifier, at a temperature $T'_1$ in order to obtain an elastomer copolymer phase (C) of the first step, the $C_2$, $C_3$ and $C_4$ monomer grafting sites being inert at the said temperature $T'_1$;

II'. in a second step, at least one monomer chosen from those defined above for entering the composition of the thermoplastic polymer P is added to the mixture and the emulsion polymerization is continued at the temperature $T'_1$ in the presence optionally of a fresh amount of an emulsifier and of at least one initiator generating free radicals in order to obtain a rigid polymer of the second step, resulting in the formation of two-layer particles, the elastomer phase (C) representing from 70 to 90% by weight of the two-layer particles;

III'. in a third step, the said particles are recovered;

IV'. in a fourth step, a polymerization of the monomer or monomers intended to enter the composition of the thermoplastic polymer P of the matrix A and of the thermoplastic polymer groups grafted onto the elastomer (C) is carried out in the presence of the particles from the third step and, optionally, in the presence of a solvent and of an initiator generating free-radicals, the said fourth step being carried out at a temperature $T'_2$ which is greater than $T'_1$ and at which the sites for grafting the monomer or monomers $C_2$, $C_3$ and $C_4$ forming the elastomer (C) are capable of initiating the polymerization;

V'. in a fifth step, the granules formed from elastomer (C) and component (A) are recovered;

VI'. in a sixth step, the granules formed from components A and C are blended with component B at a temperature of between 200 and 250° C. in order to obtain granules formed from components A, B and C.

In the second step (II'), particles 110 nm to 130 nm in size are obtained. The presence of the rigid polymer layer of the second step makes it easier to recover the particles in step III', for example by spray drying.

The proportion of emulsifier(s) is, as a general rule, less than 1% by weight, especially being between 0.1 and 0.6% by weight, on the basis of the total weight of the polymerizable monomers loaded at each of steps (I') and (II').

Among the emulsifiers, mention may be made of the usual soaps, alkyl benzene sulphonates, such as sodium dodecyl benzene sulphonate, alkylphenoxy polyethylene sulphonates, sodium lauryl sulphate, salts of long-chain amines and salts of long-chain carboxylic and sulphonic acids, long-chain acids such as lauric acid, and esters of these acids, such as potassium laurate.

The amount of free-radical initiator(s) varies depending on the monomers, on the temperature and on the mode of addition but, as a general rule, the amount of initiator(s) varies from approximately 0.01 to 5% by weight in each polymerization step on the basis of the weight of the loading of the monomers.

In steps I' and II', the polymerization mixture contains an effective amount of at least one suitable polymerization initiator generating free radicals, which is activated either by heat or by an oxidation-reduction (redox) reaction. The preferred initiators are those which are thermally activated, for example persulphates such as potassium persulphate ($K_2S_2O_8$). Suitable examples of initiators soluble in oil and insoluble in water comprise combinations such as cumene hydroperoxide and sodium metabisulphite, diisopropyl benzene hydroperoxide and sodium formaldehyde sulphoxylate, tert-butylperacetate and sodium hydrosulphite, cumene hydroperoxide and sodium formaldehyde sulphoxylate.

In step IV', it is possible to use initiators such as those mentioned above for the first process for manufacturing the thermoplastic composition.

The first and second steps are carried out at a temperature $T'_1$ generally of 80 to 110° C. and the fourth step is carried out at a temperature $T'_2$ generally of 120 to 200° C.

Moreover, it is preferred to carry out the first, second and fourth steps in the presence of at least one chain stopper or transfer agent. Examples of such agents were given above.

In the third step, it is possible to isolate the elastomer copolymer (C) in the form of particles from the latex containing it, by any technique known to those skilled in the art, such as by coagulation or by spray drying.

The polymerization of the fourth step is carried out generally using the following ingredients:

1 to 40% by weight of the two-layer particles obtained in the third step;

0 to 60% by weight of solvent, this preferably having a boiling point of 100 to 150° C., such as toluene or ethylbenzene; and 60 to 99% by weight of the monomer or monomers intended to enter the composition of the thermoplastic polymer P forming the matrix A and the groups grafted onto the elastomer (C).

In the fifth step, the granules obtained in the fourth step are recovered as indicated above for step III of the first process.

The blending of the granules obtained in step V' (formed by components A and C) and of the granules of impact modifier (B) is carried out as indicated above, by any suitable means, for example a Brabender-type mixer, a single-screw or twin-screw extruder, etc., at temperatures varying from 200° C. to 250° C.

As previously, the blend may include standard additives.

By means of the first and second processes for manufacturing the thermoplastic composition, granules are obtained which can be used to manufacture articles formed by extrusion, injection moulding, compression moulding. These formed articles may be in the form of sheets or moulded products of various shapes.

The compositions according to the invention can be used in various technical sectors, optionally in combination with other thermoplastics. Applications that may be envisaged for the compositions according to the invention are, for example, optical discs obtained by injection moulding, glazing for motor vehicles (fixed side windows and rear windows) obtained, for example, by hot forming or injection moulding, headlight protectors which are obtained by the coextrusion of a composition according to the invention with another thermoplastic such as polycarbonate, and protective films deposited by coextrusion, coating, overmoulding.

In the examples illustrating the invention, compositions in the form of granules are prepared by blending in a twin-screw extruder. The components used are given below.

In order to form the polymer P constituting Component A and the groups grafted onto component (C): methyl methacrylate (MMA).

In the case of Component B,=three-layer impact-modifier granules having the composition described in Example 2 of U.S. Pat. No. 3,793,402:

a core formed from a methyl methacrylate (99.8%)-allyl methacrylate (0.2%) copolymer;

an intermediate layer formed from a butylacrylate (79.4%)—styrene (18.6%)—allyl methacrylate (2%) copolymer; and an external layer (or compatibilizing layer) formed from a methyl methacrylate (96%)—ethyl acrylate (4%) copolymer, the distribution by weight of the core, of the interlayer and of the external layer being 30%, 50% and 20%, respectively.

In the examples, the following compounds are used for preparing elastomer (C):

| | |
|---|---|
| BuA = | butyl acrylate |
| St = | styrene |
| Bd = | butadiene |

R240 TMI=1,3-dimethyl-3-(isobutyrylperoxy)-butyl N-[1-{3-(1-methylethenyl)phenyl}-1-methylethyl] carbamate.

The granules formed from components A, B and C which are obtained are injection moulded in order to form test pieces 2 cm in width and 15 cm in length (multipurpose dumbbell test pieces according to the ISO 527/1A standard).

The mechanical properties of these test pieces are measured using the following methods:

Notched Izod impact strength: ISO 180/1A;

Tensile measurements: ISO 527/1A in the case of the flexural modulus.

These measurements are also carried out on controlled test pieces prepared in the same way but having compositions outside the invention.

Examples 1 to 4 relate to the preparation of elastomers C.

Examples 5 to 8 relate to the preparation of granules formed from elastomer component C and thermoplastic polymer component A.

Examples 9 to 14 relate to the preparation of the compositions according to the invention comprising components A, C and B (impact modifier).

Examples a) and f) relate to control compositions.

EXAMPLE 1

Elastomer Having a BuA-St Copol/PMMA Two-Layer Structure

First Step:

The following are introduced into a 20 l reactor, provided with central mechanical stirring, with a nitrogen supply and with a water coolant, and heated by means of a waterbath:

7000 g of water 20.9 g of lauric acid 5.13 g of sodium hydroxide.

Next, the contents of the reactor are degassed with nitrogen and then heated to 70° C. Once this temperature has been reached, a mixture of the following is introduced over a period of 4 hours 30 minutes while keeping the temperature at this value:

2884 g of butyl acrylate 591 g of styrene 3.66 g of tert-dodecyl mercaptan (transfer agent)

12.4 g of potassium persulphate.

Next, a postcuring operation is carried out in order to convert the last few percent of residual monomers. To do this, a mixture of:

989 g of water 1.1 g of sodium hydroxide 4.4 g of lauric acid and 32.66 g of potassium persulphate is added, again at the same temperature, and cured for 1 hour 30 minutes.

Second Step:

A hard phase is then polymerized around the soft core obtained. To do this, a pre-emulsion of:

976 g of water 5.13 g of potassium persulphate 866 g of methyl methacrylate and 2.93 g of tert-dodecyl mercaptan is added over a period of 2 hours, again at a temperature of 70° C.

A two-layer latex is obtained which is cured at 70° C. for one hour after having added to it 6.96 g of sodium hydroxide in 597.4 g of water.

The final solids content obtained is 30.52%. The diameter of the final particles is approximately 128 nm (measurement carried out using a Coulter counter).

Next, the latex powder is recovered by spray drying.

EXAMPLE 2

Elastomer Having a BuA-St-Bd Copol/PMMA Two-Layer Structure

First Step:

The following are introduced into a 20 l reactor, provided with central mechanical stirring, with a nitrogen supply and with a water coolant, and heated by means of a waterbath:

5144 g of water 22.8 g of lauric acid 5.6 g of sodium hydroxide.

Next, the contents of the reactor are degassed with nitrogen and then heated to 80° C. Once this temperature has been reached, a mixture of the following is introduced over a period of 2 hours 30 minutes while keeping the temperature at this value:

2996 g of butyl acrylate 614 g of styrene 190 g of butadiene 13.6 g of potassium persulphate 50 g of water.

Next, a postcuring operation is carried out in order to convert the last few percent of residual monomers. To do this, a mixture of:

912 g of water 1.2 g of sodium hydroxide 4.8 g of lauric acid and 9.5 g of potassium bisulphite is added, again at the same temperature, and cured for 1 hour 30 minutes.

Second Step:

A hard phase is then polymerized around the soft core obtained. To do this, a pre-emulsion of:

150 g of water 5.8 g of potassium persulphate 978.5 g of methyl methacrylate and 3.2 g of tert-dodecyl mercaptan is added over a period of 2 hours, again at a temperature of 80° C.

A two-layer latex is obtained which is cured at 80° C. for one hour after having added to it 1.9 g of sodium hydroxide in 163 g of water.

The final solids content obtained is 31.75%. The diameter of the final particles is approximately 122 nm (measurement carried out using a Coulter counter).

Next, the latex powder is recovered by spray drying.

EXAMPLE 3

Elastomer Having a BuA-St-R240TMI Copol/ PMMA Two-Layer Structure, the Copol Having 3% by Weight of R240TMI First Step:

The following are introduced into a 5 l reactor, provided with central mechanical stirring, with a nitrogen supply and with a water coolant, and heated by means of a waterbath:

1841 g of water;

5.7 g of lauric acid 1.40 g of sodium hydroxide.

Next, the contents of the reactor are degassed with nitrogen and then heated to 70° C. Once this temperature has been reached, a mixture of the following is introduced over a period of 4 hours 30 minutes while keeping the temperature at this value:

787 g of butyl acrylate 161 g of styrene 0.99 g of tert-dodecyl mercaptan 30.1 g of peroxide monomer R240 TMI 75.5 g of potassium persulphate.

Next, a postcuring operation is carried out in order to convert the last few percent of residual monomers. To do this, a mixture of:

238 g of water 0.3 g of sodium hydroxide 1.2 g of lauric acid and 0.4 g of potassium persulphate is added, again at the same temperature, and cured for 1 hour 30 minutes.

Second Step:

A hard phase is then polymerized around the soft core obtained. To do this, a pre-emulsion of:

263 g of water 1.45 g of potassium persulphate 244.6 g of methyl methacrylate and 0.8 g of tert-dodecyl mercaptan is added over a period of 2 hours, again at a temperature of 70° C.

A two-layer latex is obtained which is cured at 70° C. for one hour after having added to it 1.9 g of sodium hydroxide in 68 g of water.

The final solids content obtained is 31.54%. The diameter of the final particles is approximately 120 nm (measurement carried out using a Coulter counter).

Next, the latex powder is recovered by spray drying.

EXAMPLE 4

Elastomer Having a BuA-St-R240TMI Copol/ PMMA Two-Layer Structure, the Copol Having 4.5% by Weight of R240TMI First Step:

The following are introduced into a 5 l reactor, provided with central mechanical stirring, with a nitrogen supply and with a water coolant, and heated by means of a waterbath:

1841 g of water 5.7 g of lauric acid 1.4 g of sodium hydroxide.

Next, the contents of the reactor are degassed with nitrogen and then heated to 70° C. Once this temperature has been reached, a mixture of the following is introduced over a period of 4 hours 30 minutes while keeping the temperature at this value:

787 g of butyl acrylate 161 g of styrene 0.99 g of tert-dodecyl mercaptan 45.1 g of peroxide monomer R240 TMI 797 g of water.

Next, a postcuring operation is carried out in order to convert the last few percent of residual monomers. To do this, a mixture of:

228 g of water 0.3 g of sodium hydroxide 1.2 g of lauric acid and 0.4 g of potassium persulphate is added, again at the same temperature, and cured for 1 hour 30 minutes.

Second Step:

A hard phase is then polymerized around the soft core obtained. To do this, a pre-emulsion of:

263 g of water 1.47 g of potassium persulphate 248.33 g of methyl methacrylate and 0.8 g of tert-dodecyl mercaptan is added over a period of 2 hours, again at a temperature of 70° C.

A two-layer latex is obtained which is cured at 70° C. for one hour after having added to it 1.9 g of sodium hydroxide in 163 g of water.

The final solids content obtained is 31.14%. The diameter of the final particles is approximately 112 nm (measurement carried out using a Coulter counter).

Next, the latex powder is recovered by spray drying.

EXAMPLE 5

Introduced into a 20 l reactor fitted with a mechanical stirrer and maintained at 15° C. is a mixture composed of:

5500 g of methyl methacrylate 4000 g of toluene and 27.5 g of 1-dodecanethiol

Next, 500 g of the elastomer obtained in Example 2 are added to the mixture. After the elastomer has completely dissolved, the mixture is transferred to a stainless steel reactor having a working volume of 16 litres and which is equipped with a jacket, with a mechanical stirrer and with a discharge and granulation system. After the transfer, 2.2 g of di-tert-butyl peroxide (sold by Aldrich under the name "TRIGONOX B") (polymerization initiator) and 5.5 g of octadecyl-3-(3,5-di-tert-butyl-4-hydroxyphenyl)propionate (antioxidant) sold under the name "IRGANOX 1076" by Ciba-Geigy are added.

The mixture is heated to 125° C. with the following temperature cycle: 45 minutes for heating the mixture from room temperature to 100° C., 1 hour to 110° C., 2 hours to 120° C. and 1 hour to 125° C. The degree of conversion is 85%.

Next, the product is heated to 200° C. and the toluene is removed under vacuum. The polymer, stripped of the solvent, is recovered in the form of granules.

EXAMPLE 6

The preparation is carried out as in Example 5, using:

6500 g of methyl methacrylate 3000 g of toluene 26 g of 1-dodecanethiol 500 g of elastomer of Example 4

6.5 g of "IRGANOX 1076"

2.6 g of "TRIGONOX B".

The degree of conversion is 100%.

The product is heated to 200° C. and the toluene is removed under vacuum. The polymer, stripped of the solvent, is recovered in the form of granules.

EXAMPLE 7

The preparation is carried out as in Example 5, using:

4400 g of methyl methacrylate 3200 g of toluene 22 g of 1-dodecanethiol 160 g of elastomer of Example 1

240 g of the elastomer of Example 3

4.4 g of "IRGANOX 1076"

1.76 g of "TRIGONOX B".

The degree of conversion is 82.5%.

The product is heated to 200° C. and the toluene is removed under vacuum. The polymer, stripped of the solvent, is recovered in the form of granules.

EXAMPLE 8

The preparation is carried out as in Example 5, using:

6300 g of methyl methacrylate 3000 g of toluene 700 g of styrene-butadiene (40%/60% by weight) copolymer elastomer sold under the name BL6533 by Bayer 25.2 g of 1-dodecanethiol 2.04 g of "TRIGONOX B"

6.3 g of "IRGANOX 1076".

The degree of conversion is 86.5%.

The product is heated to 200° C. and the toluene is removed under vacuum. The polymer, stripped of the solvent, is recovered in the form of granules.

EXAMPLES 9 TO 14

Granules formed from component A (thermoplastic polymer) and component C (elastomer) which are obtained in Examples 5 and 6 are blended with granules of component B indicated above in the proportions indicated in Table 1 using a Haake-type twin-screw extruder, the temperature varying from 230° C. to 250° C. between the granule-feed zone and the die.

Rods are obtained which are chopped in order to obtain granules.

The test pieces are prepared by injection-moulding the granules obtained, using an Arburg injection moulding machine, the screw diameter being 25 mm, the shot volume being 39 cm$^3$ and the closure force being 35 MPa, with the temperature profile varying from 240° C. to 250° C. and the mould temperature being 50° C.

The values of the flexural modulus (in MPa) and the impact strength (in kJ/m$^2$) are also indicated in Table 1.

EXAMPLES (a) TO (d)

Control

Under the same conditions as in Examples 9 to 14, granules of the product Oroglas V825T® from Atoglas Europe SAS, which consist of an MMA (99% by weight)—ethyl acrylate (1% by weight) copolymer of weight-average molecular mass of approximately 90,000 g/mol, are blended with granules of component B indicated above.

The amounts of each of the components and the values of the flexural modulus (in MPa) and the impact strength (in kJ/m$^2$) are indicated in Table 2.

EXAMPLES (e) AND (f)

Control

Test pieces are formed, using the process indicated in Examples 9 to 14, from granules from Examples 5 and 6 respectively, these being formed from components A and C, and the flexural modulus and the impact strength are measured.

The results are indicated in Table 2.

It should be noted that, as indicated in the control examples (a) to (d), the addition of a standard impact-modifying compound to a PMMA thermoplastic polymer makes it possible to increase the impact strength but decreases the flexural modulus.

With the compositions according to the invention, it should be noted that the combination of the thermoplastic polymer A (PMMA), the impact modifier (B) and the elastomer (C), as described in the present invention, makes it possible to obtain a good compromise between the impact strength and flexural modulus values. In particular, it may be noted that in Example 9, with only 10% of component B and 9% of elastomer copolymer C, impact strength and flexural modulus values are obtained which are superior to those obtained with a PMMA component A (80%)—component B (20%) composition—Example (c).

TABLE 1

| EXAMPLES | COMPOSITIONS A | C | B | FLEXURAL MODULUS (MPa) | NOTCHED IZOD IMPACT STRENGTH (kJ/m²) |
|---|---|---|---|---|---|
| 9 | Ex. 5 granules | | | | |
| | PMMA 81% | BuA/St/Bd 9% | 10% | 2780 | 5.5 |
| 10 | Ex. 5 granules | | | | |
| | 72% | 8% | 20% | 2500 | 7.6 |
| 11 | Ex. 5 granules | | | | |
| | 54% | 6% | 40% | 2076 | 10.5 |
| 12 | Ex. 6 granules | | | | |
| | PMMA 55.7% | BuA/St/TMI 4.3% | 40% | 2097 | 8.7 |
| 13 | Ex. 6 granules | | | | |
| | 74.3% | 5.7% | 20% | 2624 | 4.6 |
| 14 | Ex. 6 granules | | | | |
| | 83.5% | 6.5% | 10% | 2874 | 3.0 |

TABLE 2

Comparative table

| EXAMPLES | COMPOSITIONS A | C | B | FLEXURAL MODULUS (MPa) | NOTCHED IZOD IMPACT STRENGTH (kJ/m²) |
|---|---|---|---|---|---|
| (a) | 100% | — | — | 3450 | 2.2 |
| (b) | 90% | — | 10% | 2990 | 2.23 |
| (c) | 80% | — | 20% | 2639 | 3.19 |
| (d) | 60% | — | 40% | 2100 | 4.54 |
| (e) | Ex. 5 granules | | | | |
| | 90% | 10% | — | 3220 | 2.6 |
| (f) | Ex. 6 granules | | | | |
| | 93% | 7% | — | 3210 | 2.5 |

What is claimed is:

1. An impact-resistant thermoplastic composition comprising:
   A) a rigid thermoplastic methacrylic polymer or copolymer matrix P containing 51–100% by weight methyl methacrylate units, and
   B) at least one impact-modifying additive,
   where said composition further comprises (C) at least one elastomer copolymer which contains grafting sites, at least on pendant chains, wherein copolymer (C) is obtained from at least one vinylaromatic monomer ($C_1$) and at least one monomer chosen from the monomers:
   ($C_2$) $C_1$–$C_{15}$ linear or branched alkyl acrylates, $C_1$–$C_4$ alkoxyalkyl acrylates and aralkyl acrylates,
   ($C_3$) dienes, and
   ($C_4$) ethylenically unsaturated monomers having one or more pendant initiating functional groups,
   wherein said copolymer (C) is grafted by thermoplastic polymer groups P and is dispersed in the matrix (A) in the form of nodules from 10 nm to 500 nm in size and able to have a droplet, capsule-type monoinclusion and/or salami-type multi-inclusion morphology.

2. A composition according to claim 1, comprising, by weight, from 50 to 85% of component A, from 6 to 40%, of component B and from 2 to 15% of component (C).

3. A composition according to claim 1, wherein component (A) comprises 0 to 49% by weight of ethylenically unsaturated comonomer units copolymerizable with methyl methacrylate.

4. A composition according to claim 3, wherein the ethylenically unsaturated comonomers are chosen from acrylic, methacrylic and vinylaromatic monomers.

5. A composition according to claim 1, wherein the thermoplastic polymer P forming the matrix (A) and the thermoplastic polymer P for the grafting of the elastomer copolymer (C) are homopolymer poly(methyl methacrylate).

6. A composition according to claim 1, wherein the ($C_1$) are styrene, the ($C_2$) monomers are $C_4$–$C_{10}$ alkyl acrylates the ($C_3$) monomers is butadiene and the ($C_4$) monomers are monomers having peroxide pendant initiating functional groups.

7. A composition according to claim 6, wherein the monomers ($C_4$) are chosen from:

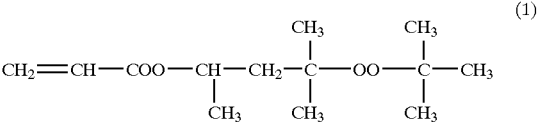

(1)

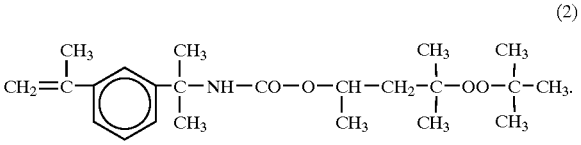

(2)

8. A composition according to claim 1, wherein copolymer C contains, per 100 parts by weight:
   15 to 40 parts by weight of $C_1$;
   0 to 85 parts by weight of $C_2$;
   0 to 60 parts by weight of $C_3$;
   0 to 5 parts by weight of $C_4$.

9. A thermoplastic composition according to claim 1, wherein copolymer (C) includes at least one transfer agent or chain stopper, which is introduced in an amount ranging up to 5% by weight, with respect to monomers $C_1$, $C_2$, $C_3$, and $C_4$.

10. A thermoplastic composition according to claim 9, wherein the transfer agent or agents are chosen from mercaptans, polymercaptans, polyhalogenated compounds, monoterpenes, monounsaturated diterpenes and thioglycolic acid.

11. A composition according to claim 1, wherein component (B) is formed by a block copolymer comprising at least one elastomer block or a multilayer composite copolymer comprising at least one elastomer layer.

12. A composition according to claim 11, wherein component (B) is formed by a block copolymer comprising at least one elastomer block which is derived from substituted or unsubstituted butadiene, alkyl acrylate or aralkyl acrylate monomers.

13. A composition according to claim 11, wherein component (B) is a multilayer composite copolymer comprising at least one elastomer layer which is derived from substituted or unsubstituted butadiene, alkyl acrylate or aralkyl acrylate monomers, or possibly from ethylenically unsaturated comonomers, crosslinking monomers and/or grafting monomers.

14. A composition according to claim 1, wherein component (C) is chosen from the group formed by butyl acrylate/ styrene/butadiene copolymers, butyl acrylate/styrene/peroxide monomer copolymers and styrene/butadiene copolymers.

15. A process for manufacturing the thermoplastic composition as defined in claim 1, said process comprising:
   (I) in a first step, a solution copolymerization of the monomers chosen from the monomers $C_1$, $C_2$, $C_3$ and $C_4$ is carried out at a temperature $T_1$ in the presence of at least one free-radical initiator, which is soluble in the solvent and capable of initiating the polymerization at the temperature $T_1$, in order to obtain an elastomer (C), the sites for grafting the $C_2$, $C_3$ and $C_4$ monomers being inert at the said temperature $T_1$;
   (II) in a second step, a polymerization is carried out, in the presence of the elastomer (C) of the first step, of the monomer or monomers intended to enter the composition of the thermoplastic polymer P of the matrix A and of the thermoplastic groups grafted onto the elastomer (C), optionally in the presence of at least one free-radical initiator, the said monomer or monomers being introduced in the pure state or dissolved in a solvent and the second step being carried out at a temperature $T_2$, which is greater than $T_1$ and at which the sites for grafting the monomer or monomers $C_2$, $C_3$ and $C_4$ are capable of initiating the polymerization or of initiating the grafting of the polymer groups P, the solvents for the first and second steps possibly being identical and being chosen so that the elastomer (C) which is formed in the first step and the thermoplastic polymer P which is formed in the second step are soluble in the said solvent;
   (III) in a third step, granules formed from components A and C are recovered; and
   (IV) in a fourth step, the granules obtained from step III are blended with component B at a temperature of between 200 and 250° C. in order to obtain granules formed from components A, B and C.

16. A process according to claim 15, wherein the solvent or solvents are chosen from those having a boiling point of 100 to 150° C.

17. A process according to claim 16, wherein the solvent is toluene or ethylbenzene.

18. A process according to claim 15, wherein the polymerization of the first step is carried out until a solids content of 10 to 80% by weight is obtained.

19. A process according to claim 15, wherein the first step, and optionally the second step, is carried out in the presence of at least one chain stopper or transfer.

20. A process according to claim 15, wherein the first step, and optionally the second step, is carried out in the presence of at least one free-radical initiator in an amount from 0.01 to 5% by weight on the basis of the weight of the loading of the monomers present, chosen from $C_1$, $C_2$, $C_3$ and $C_4$.

21. A process according to claim 15, wherein the first step is carried out at a temperature $T_1$ of 80–110° C. and the second step is carried out at a temperature $T_2$ of 120–200° C.

22. A process according to claim 15, wherein the polymerization of the second step is carried out using the following ingredients:
   1 to 40% by weight of the elastomer (C) obtained in the first step; and
   60 to 99% by weight of the monomer or monomers intended to enter the composition of the thermoplastic polymer P, if necessary in the presence of an amount of solvent ranging up to 60%.

23. A process according to claim 15, wherein in the fourth step the blending of the granules formed from components A and C with component B takes place in an extruder at a temperature of between 200 and 250° C.

24. A process for manufacturing the thermoplastic composition as defined in claim 1, said process comprising:
   (I') in a first step, an emulsion copolymerization of monomers chosen from the monomers $C_1$, $C_2$, $C_3$ and $C_4$ is carried out in an aqueous medium, in the presence of at least one initiator generating free radicals and of at least one emulsifier, at a temperature $T'_1$ in order to obtain an elastomer copolymer (C) of the first step, the $C_2$, $C_3$ and $C_4$ grafting sites being inert at the said temperature $T'_1$;
   (II') in a second step, at least one monomer chosen from those defined for entering the composition of the thermoplastic polymer P is added to the mixture and the emulsion polymerization is continued at $T'_1$ in the presence of at least one initiator generating free radicals and optionally of a fresh amount of an emulsifier, in order to obtain a rigid polymer of the second step, resulting in the formation of two-layer particles, the elastomer phase (C) representing from 70 to 90% by weight of the two-layer particles;
   (III') in a third step, the said particles are recovered;
   (IV') in a fourth step, a polymerization of the monomer or monomers intended to enter the composition of the thermoplastic polymer P of the matrix A and of the thermoplastic polymer groups grafted onto the elastomer (C) is carried out in the presence of the particles from the third step and, optionally, in the presence of a solvent and of a free-radical initiator, the said fourth step being carried out at a temperature $T'_2$ which is greater than $T'_1$ and at which the sites for grafting the monomer or monomers $C_2$, $C_3$ and $C_4$ are capable of initiating the polymerization;
   (V') in a fifth step, the granules formed from elastomer component C and component A are recovered; and
   (VI') in a sixth step, the granules formed from components A and C are blended with component B at a temperature of between 200 and 250° C. in order to obtain granules formed from components A, B and C.

25. A process according to claim 24, wherein in step II', particles between 110 nm and 130 nm in size are obtained.

26. A process according to claim 24, wherein the proportion of emulsifier is less than 1% by weight, on the basis of the total weight of the polymerizable monomers loaded at each of steps (I') and (II').

27. A process according to claim 24, wherein the amount of free-radical initiator is from 0.01 to 5% by weight in each of steps (I') and (II') and optionally in step (IV') on the basis of the weight of the loading of the monomers.

28. A process according to claim 24, wherein the first and second steps are carried out at a temperature $T'_1$ of 80 to 110° C. and the fourth step is carried out at a temperature $T'_2$ of 120 to 200° C.

29. A process according to claim 24, wherein the first, second and fourth steps are carried out in the presence of at least one chain stopper or transfer agent.

30. A process according to claim 24, wherein the solvent of the fourth step is chosen from those having a boiling point of 100 to 150° C.

31. A process according to claim 24, wherein the polymerization of the fourth step is carried out using the following ingredients:
   1 to 40% by weight of the two-layer particles obtained in the third step;
   0 to 60% by weight of solvent; and
   60 to 99% by weight of the monomer or monomers intended to enter the composition of the thermoplastic polymer P.

32. A process according to claim 24, wherein in the sixth step, the granules formed from components A and C obtained in step (V') are blended with component B in order to obtain granules formed from components A, B and C.

33. A formed article obtained by moulding, the thermoplastic composition as defined in claim 1.

34. A composition according to claim 2, comprising, by weight, from 70 to 80% of component A, 10 to 40% of component B, and 4 to 10% of component (C).

35. A composition according to claim 34, comprising 10 to 20% of component B.

36. A composition according to claim 8, wherein copolymer C contains, per 100 parts by weight:

16 to 20 parts by weight of $C_1$;

40 to 82 parts by weight of $C_2$;

0 to 5 parts by weight of $C_3$; and 0 to 4.5 parts by weight of $C_4$.

37. A thermoplastic composition according to claim 9, wherein copolymer (C) includes at least one transfer agent or chain stopper, which is introduced in an amount ranging up to 1% by weight with respect to monomers $C_1$, $C_2$, $C_3$, and $C_4$.

38. A process according to claim 24, wherein the proportion of emulsifier is between 0.1 and 0.6% by weight on the basis of the total weight of the polymerizable monomers loaded at each of steps (I') and (II').

39. A process according to claim 24, wherein the solvent of the fourth step is toluene or ethylbenzene.

40. A composition according to claim 4, wherein said ethylenically unsaturated comonomers are selected from alkyl acrylates in which the alkyl group has 1 to 8 carbon atoms, hydroxyalkyl or alkoxyalkyl acrylates in which the alkyl group has from 1 to 4 carbon atoms, acrylamide, acrylonitrile, methacrylic acid, alkyl methacrylates in which the alkyl group has from 2 to 8 carbon atoms, methacrylonitrile, hydroxyalkyl or alkoxyalkyl methacrylates in which the alkyl group has from 1 to 4 carbon atoms, styrene, α-methylstyrene, monochlorostyrene and tert-butylstyrene.

41. A composition according to claim 1, wherein component (B) is a polymer substance having a multilayer structures in which at least one layer is an elastomer layer.

42. A composition according to claim 1, wherein component (B) is in the form of particles having a mean diameter between 40 and 500 nm.

43. A composition according to claim 1, wherein the refractive index of matrix A and the refractive index copolymer C differ by ≦0.02.

* * * * *